March 17, 1970 — C. S. LAUTENBACH — 3,501,121
SEAT ADJUSTER
Filed Feb. 1, 1968 — 2 Sheets-Sheet 1

INVENTOR.
Charles S. Lautenbach
BY
C. J. Biskup
ATTORNEY

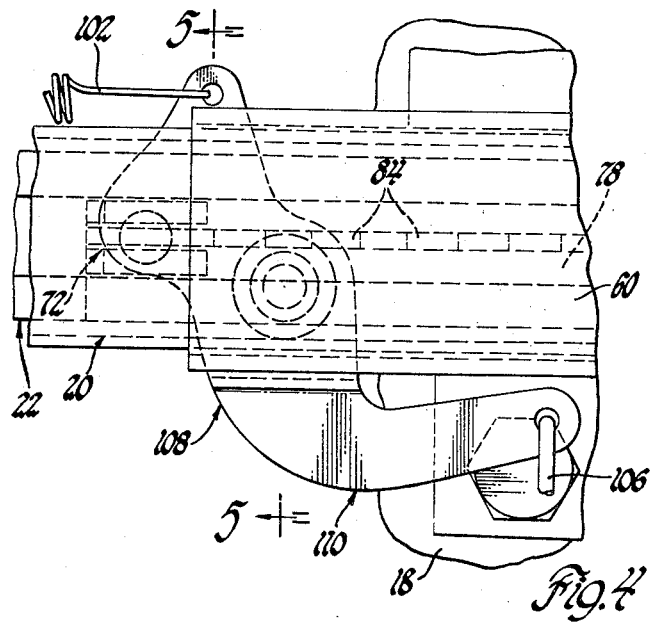
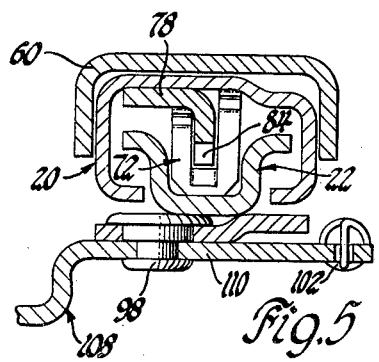
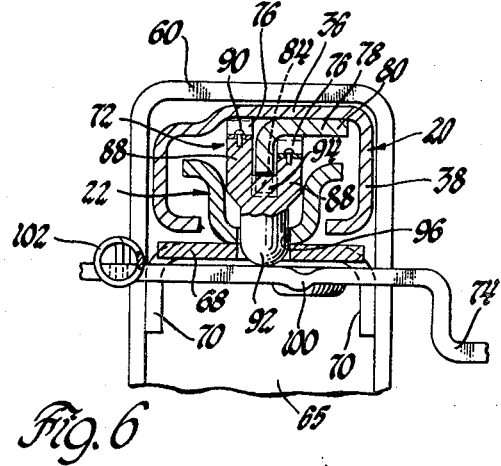
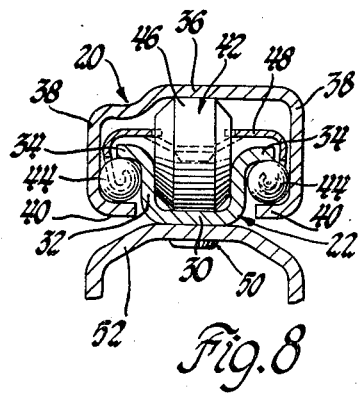
INVENTOR.
Charles S. Lautenbach

United States Patent Office 3,501,121
Patented Mar. 17, 1970

3,501,121
SEAT ADJUSTER
Charles S. Lautenbach, Rochester, Mich., assignor to General Motors Corporation, Detroit, Mich., a corporation of Delaware
Filed Feb. 1, 1968, Ser. No. 702,468
Int. Cl. B60n 1/08; F16m 13/00
U.S. Cl. 248—430
3 Claims

ABSTRACT OF THE DISCLOSURE

A seat support and adjusting device of the type using longitudinally telescoping channel members and characterized in that the operating handle has a portion that normally cams a separate locking member into wedging, latching engagement between the channel members and thereby longitudinally positions the associated seating structure.

---

Motor vehicle front seats are conventionally mounted on a seat adjuster mechanism for adjustably positioning the seat to accommodate driver preferences. In general, these seat adjusters comprise a lower channel secured to the vehicle floor and a telescoping upper channel on which the seating unit is mounted. To permit selective positioning of the seating unit, the seat adjuster mechanism includes a control lever that is connected to one of the channel members and has an integral locking bar that engages longitudinally spaced notches, grooves, or slots formed in the other of the channel members. Because of this customary single piece construction, the forces transmitted to the locking bar under fore-and-aft loading of the seating unit, may tend to bend the lock bar. It is therefor desirable that the locking portion positively engage the notches under loading and, at the same time, be designed so as to neutralize any bending forces on the control lever. Moreover, engagement and disengagement of the latching mechanism should be accomplished without requiring undue operator effort. In other words, the control lever should be securely engaged under loading conditions while, at the same time, be easily movable between latched and unlatched positions when it is desired to change the longitudinal adjustment of the seating unit.

The present invention accomplishes the above objectives by providing a latching mechanism for a seat adjuster wherein a separate shiftable locking member, controlled by an operating handle, securely locks the telescoping channel members and, at the same time, is easily shiftable between latched and unlatched positions. In the preferred form, the locking member includes an upper portion adapted to engage longitudinally spaced notches formed in the upper channel member and a lower portion that projects through the lower channel member. Spring means continuously urge the locking member into a lowered unlatched position while the operating handle, pivotally connected to the lower channel member, includes a cam surface that normally engages the lower portion of the locking member and maintains the latter in an upper latched position. Under normal operating conditions, the locking member shifts freely between the aforementioned positions and the seat adjuster is easily movable between a plurality of seating positions. However, under frontal or rearward loading, this independent locking member limitedly rotates into positive wedging engagement between the latching notches and the lower channel without transmitting any of the loading forces to the operating handle. The seat adjuster is also provided wtih a rear support bracket that tightly encompasses the channels and prevents a separating of the upper channel from the lower channel during seat impact loading. This feature, in turn, prevents disengagement of the latching mechanism even under severe loading such as would be encountered if seat belts are attached directly to the seating unit.

The objects of the present invention are: to provide a seat adjuster that selectively longitudinally positions a seat and includes an independent locking member operable by a manually controlled handle; to provide a seat adjuster wherein a cam-operated locking member selectively locks relatively telescoping channel members; to provide a seat adjuster of the type using telescoping upper and lower channel members wherein the channel members are normally restrained from relative movement by an independent locking member operated by a manually controlled handle in a manner such that frontal and rearward impact forces acting on the seat adjuster are transmitted only to the locking member; and to provide a latching mechanism for a seat adjuster of the type using telescoping upper and lower channel members wherein an independent spring biased locking member has an upper portion selectively engageable with a plurality of longitudinally spaced notches formed in the upper channel member and also has a lower portion projecting through the lower channel member for engagement with a manually operable cam that controls shifting of the locking member between latched and unlatched positions.

These and other objects will be apparent to one skilled in the art upon reading the following detailed description, reference being made to the accompanying drawings in which:

FIGURE 4 is a partial top view showing the latching mechanism for the inboard seat adjuster of the present invention;

FIGURE 5 is a view taken along line 5—5 of FIGURE 4;

FIGURE 6 is a view taken along line 6—6 of FIGURE 1 showing the seat adjuster in the latched condition;

FIGURE 7 is a view similar to FIGURE 6 showing the seat adjuster in the unlatched condition;

FIGURE 8 is a view taken along line 8—8 of FIGURE 1; and

FIGURE 9 is a perspective view of the locking member shown in FIGURE 1.

Figure 1:
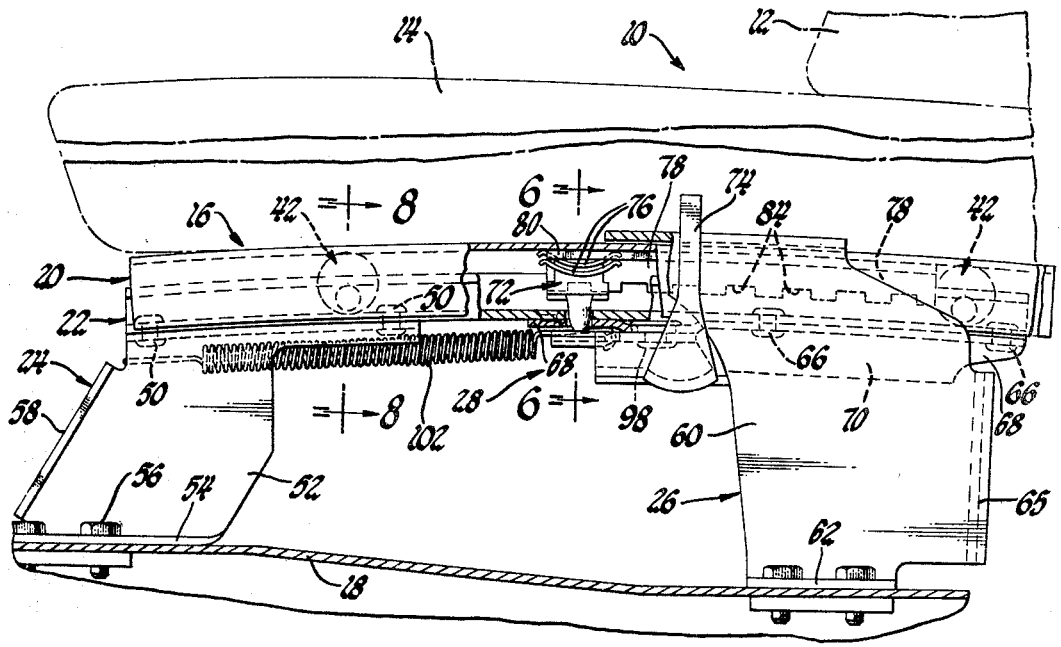
FIGURE 1 is a partially sectioned side elevational view of a seating unit incorporating a seat adjuster made in accordance with the present invention.

Referring now to FIGURE 1, there is shown a conventional front automobile seating unit 10 including a seat back 12 and a seat cushion 14 fixedly mounted on a seat adjusting mechanism according to this invention and generally indicated by reference numeral 16. The seat adjusting mechanism 16 is fixedly connected to the vehicle floor 18 and generally comprises a movable upper slide or channel member 20, a stationary lower slide or channel member 22, a front support bracket 24, a rear support member 26, and a latching mechanism 28. While FIGURE 1 shows a single seat adjusting mechanism 16, it will be understood that conventional seating units are provided with separate inboard and outboard or, alternatively right-hand and left-hand adjusting mechanisms in parallel spaced relationship. Further description of the seat adjusting mechanism will proceed generally with reference to the outboard structure, the inboard mechanism differing only in details to be subsequently described.

Referring now to FIGURE 8, the lower channel member 22 comprises a base portion 30, laterally spaced upwardly extending legs 32 terminating in laterally extending, outwardly curved flanges 34. The upper channel member 20 invertedly encompasses the lower channel member 22 and includes a base portion 36 and downwardly depending legs 38 at each side thereof. Each of the legs 38 terminates in a laterally extending, inwardly curved flange 40. The upper channel member 20 and lower channel member 22 are complementally formed to provide raceways for an associated bearing assembly 42.

The bearing assembly 42 includes a pair of ball bearings 44, interposed in the raceways between flanges 40 and 34, and a cylindrical roller bearing 46 interposed between the base portions 36 and 30. The ball bearings 44 and the roller bearing 46 are maintained in longitudinal and lateral spaced relationship by a bearing cage 48 of any convenient form. The cylindrical roller bearing 46 transmits the vertical loading on the seating unit 10 from the upper channel member 20 to the lower channel member 22 while ball bearings 44 provide lateral stability for the upper channel member 20. The bearing assembly 42 rolls in the raceways between stop positions to be subsequently described and permits longitudinal telescoping of the upper channel member 20 relative to the lower channel member 22. As shown in FIGURE 1, a pair of bearing assemblies 42 are provided, one located at each end of the adjusting mechanism 16.

Figure 2:
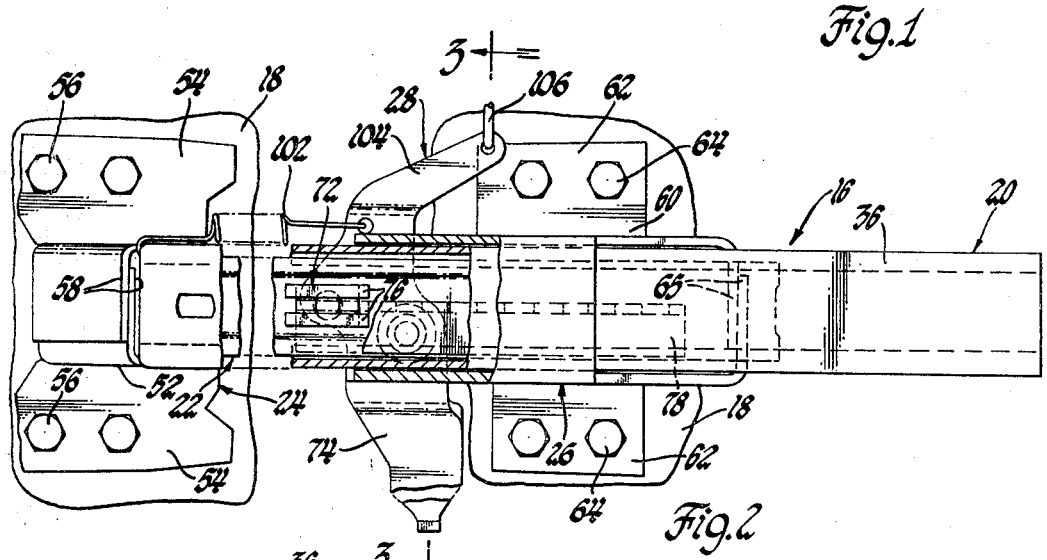
FIGURE 2 is an enlarged fragmentary, partially sectioned top view of the seat adjuster shown in FIGURE 1.

Referring again to FIGURE 1, the front support bracket 24 is fixedly connected to the lower channel member 22 by means of rivets 50 or other suitable fasteners which additionally serve as stops for the forward bearing assembly 42. The front support bracket 24 further includes laterally spaced downwardly extending legs 52 terminating in outwardly turned flanges 54 that are fixedly connected to the vehicle floor 18 by means of bolts 56. As shown in FIGURE 2, the legs 54 are laterally joined by inwardly turned, overlapping flanges 58 that are spot welded together. This construction provides increased lateral and longitudinal impact strength for the front support bracket.

The rear support member 26 comprises a rear support bracket 60 invertedly encompassing and restraining deformation of the upper channel member 20. The support member 26 has downwardly extending leg portions terminating in lower outwardly turned flanges 62 that are fixedly secured to the vehicle floor 18 by means of bolts 64. The leg portions are laterally joined by spot welded inwardly turned overlapping flanges 65. By encompassing the upper channel member 20, the rear support bracket 60 prevents a spreading and separation of the former from the lower channel member 22 when subjected to frontal or rearward impact loading conditions. The rear portion of the lower channel member 22 is fixedly connected by means of rivets 66 to an inverted U-shaped guide plate 68, the rivets forming stops for the rear bearing assembly 42. The guide plate 68, in turn, is fixedly connected at downwardly depending arm portions 70 to the leg portions of the rear support bracket 60 by any suitable means such as spot welding.

As shown in FIGURES 1 and 2, the latching mechanism 28 generally comprises a vertically shiftable latch or locking member 72, an operating handle 74, a pair of leaf springs 76 and a latching plate 78. The latching plate 78, generally L-shaped in cross section, includes a lateral arm portion 80 fixedly connected to the underside of the upper channel base 36 and a downwardly depending arm 82 having a plurality of uniformly longitudinally spaced transverse latching notches 84 formed at the lower end thereof.

Referring now to FIGURE 9, the locking member 72 includes a saddle-shaped upper portion 86 defined by laterally spaced upwardly extending side arms 88 to which the leaf springs 76 are connected by pins 90. A cylindrical lower portion 92 and rectangular head portion 94 are rigidly formed with the portion 86 and located between the side arms 88. As will be more fully explained, the head portion 94 is engageable with the latching notches 84 to establish a plurality of longitudinal seating positions.

Figure 3:
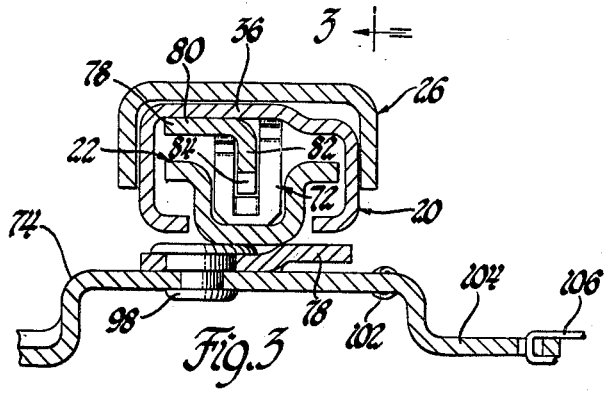
FIGURE 3 is a view taken along line 3—3 of FIGURE 2.

As shown more clearly in FIGURE 6, the locking member 72 is interposed between the upper channel 20 and the lower channel 22 and has the lower portion 92 received within and extending through a guide aperture 96, formed in the guide plate 68 and the lower channel 22. In this position, the side arms 88 straddle the guide plate 68 thereby providing a stable lateral alignment for the locking member 72. The locking member 72 is shiftable between the latched position shown in FIGURE 6 and the unlatched position shown in FIGURE 7, and is spring biased to the latter position by the leaf springs 76. The operating handle 74 is pivotally connected to the lower channel member 22 by pivot connection 98 and includes a downwardly curved camming surface 100 adapted to normally engage and shift the lower portion 92 of the locking member 72 upwardly against the bias of springs 76. The operating handle 74 is spring biased to the FIGURE 6 latched position by means of a coil spring 102. As shown more clearly in FIGURES 2 and 3, an inboard arm 104 of the operating handle 74 includes a tie rod 106 that interconnects the outboard latching mechanism 28 with the inboard latching mechanism 108 shown in FIGURE 4. The latching mechanism 108 is identical to that previously described, the only difference being the elimination of the operating handle and substitution therefor of an operating arm 110 to which the tie rod 106 is attached. As in conventional seat adjusters, the inboard latching mechanism 108 is adapted to latch and unlatch simultaneously with the operation of the outboard latching mechanism.

As seen in FIGURE 2, to adjust the longitudinal position of the seat adjusting mechanism 16, the operating handle 74 is manually moved clockwise about pivot connection 98 to the FIGURE 7 position. In this position, the camming surface 100 is moved out of engagement with the locking member 72 and the latter is free to move downwardly under the influence of springs 76 out of latching engagement with notches 84 so that the upper channel member 20 can be longitudinally moved relative to the lower channel member 22. When the desired seating position is reached, the operating handle 74 is released and is automatically returned to the FIGURE 6 position by spring 102 at which time the camming surface 100 engages the lower portion 92 of the locking member 72 to shift the head portion 94 into latching engagement with the associated latching notch 84.

As seen in FIGURE 1, under impact loading conditions, the locking member 72 will tend to rotate about a transverse axis either counter-clockwise or clockwise, depending on the direction the loading is applied. In either instance, this limited rotation more affirmatively wedges or jams the lower portion 92 into positive engagement with guide aperture 96 and the head portion 94 into wedging engagement with the latching notch 84. Inasmuch as there is no direct contact with the operating handle 74, no forces are transmitted to the latter that would tend to disengage it. In the event that seat belts are directly attached to the seating unit 10 and an upward force is directed on the upper channel 20, the rear support bracket will laterally restrain the side arms 38 to resist separation of the lower channel 22 from the upper channel 20.

Since other changes and modifications will be apparent to one skilled in the art, the scope of the invention, as defined by the appended claims, is intended to cover such alterations of the illustrative embodiment.

What is claimed is:

1. A seat adjuster comprising, in combination, a pair of telescopic channel members, each including a base portion located in generally parallel spaced relationship to the other by antifriction elements therebetween, a latching member extending generally normally of one base portion toward the other and including a plurality of longitudinally spaced abutments, a latch member located between the base portions and having a first portion slidably received within an opening in the other base portion to mount the latch member thereon for bodily shiftable movement generally normally of the base portions, the latch member having a second portion engageable with a selected one of the abutments to interconnect the base portions and lock the channel members to each other, means biasing the latch member normally of the one base portion to move the second portion thereof out of engagement with the selected one abutment and permit telescopic adjustment of the channel members, and means engageable with the first portion of the latch member to move the latch member against the action of the biasing means generally normally of the other base portion and move the second portion thereof into engagement with a selected one of the abutments.

2. A seat adjuster comprising, in combination, a pair of telescopic channel members, each including a base portion located in generally parallel spaced relationship to the other by antifriction elements therebetween, a latching plate extending generally normally of one base portion toward the other and including a plurality of longitudinally spaced notches, a latch member located between the base portions and having a first portion slidably received through a like shaped opening in the other base portion to mount the latch member thereon for bodily shiftable movement generally normally of the base portions, the latch member having a second portion straddling the latching plate and including an abutment engageable with a selected one of the notches to lock the channel member base portions to each other, means biasing the latch member normally of the one base portion to move the abutment of the second portion out of engagement with the selected one notch and permit telescopic adjustment of the channel members, and means engageable with the first portion of the latch member to move the latch member against the action of the biasing means normally of the other base portion and move the abutment of the second portion into engagement with a selected one of the notches.

3. A seat adjuster comprising, in combination, a pair of telescopic channel members, each including a base portion located in generally parallel spaced relationship to the other by antifriction elements therebetween, a latching plate extending generally normally of one base portion toward the other and including a plurality of longitudinally spaced notches, a latch member located between the base portions and having an annular first portion slidably extending through a like shaped opening in the other base portion to mount the latch member thereon for bodily shiftable movement generally normally of the base portions, the latch member having a second portion straddling the latching plate and including an abutment engageable with a selected one of the notches to lock the channel member base portions to each other, means biasing the latch member normally of the one base portion to move the second portion abutment out of engagement with the selected one notch and permit telescopic adjustment of the channel members, and manually operated means engageable with the first portion of the latch member outwardly of the opening in the other base portion to move the latch member against the action of the biasing means generally normally of the other base portion and move the second portion abutment into engagement with a selected one of the notches.

References Cited

UNITED STATES PATENTS

| 2,127,610 | 8/1938 | Moore | 248—430 |
| 2,235,904 | 3/1941 | Schulz | 248—430 |
| 2,336,433 | 12/1943 | Woing | 248—430 |
| 2,351,778 | 6/1944 | Moulding | 248—430 |
| 3,052,443 | 9/1962 | Lagstrom | 248—430 |
| 3,188,045 | 6/1965 | Fowler et al. | 248—429 |
| 3,350,046 | 10/1967 | Kirk | 248—430 |
| 3,394,912 | 7/1968 | Bullen | 248—430 |

FOREIGN PATENTS

| 444,752 | 3/1936 | Great Britain. |
| 1,071,302 | 3/1954 | France. |

FRANCIS K. ZUGEL, Primary Examiner

U.S. Cl. X.R.

248—420